United States Patent
Liu et al.

(10) Patent No.: US 7,490,267 B2
(45) Date of Patent: Feb. 10, 2009

(54) SYSTEM AND METHOD FOR TESTING COMPUTER

(75) Inventors: Yi-Bo Liu, Shenzhen (CN); Li-Ping Chen, Tu-Cheng (TW)

(73) Assignees: Hong Fu Jin Precision (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 165 days.

(21) Appl. No.: 11/309,231

(22) Filed: Jul. 14, 2006

(65) Prior Publication Data

US 2007/0214390 A1 Sep. 13, 2007

(30) Foreign Application Priority Data

Mar. 7, 2006 (CN) .................. 2006 1 0034231

(51) Int. Cl.
*G06F 11/00* (2006.01)
(52) U.S. Cl. .................................................. 714/27
(58) Field of Classification Search ............. 714/27–31, 714/37, 38
See application file for complete search history.

(56) References Cited

U.S. PATENT DOCUMENTS

| | | | | |
|---|---|---|---|---|
| 6,247,126 | B1 * | 6/2001 | Beelitz et al. ................... | 713/1 |
| 6,304,982 | B1 * | 10/2001 | Mongan et al. ............... | 714/38 |
| 6,522,995 | B1 * | 2/2003 | Conti et al. .................. | 702/186 |
| 2004/0003325 | A1 * | 1/2004 | Muller et al. .................. | 714/38 |
| 2005/0246589 | A1 * | 11/2005 | Tsai et al. ..................... | 714/38 |

* cited by examiner

*Primary Examiner*—Nadeem Iqbal
(74) *Attorney, Agent, or Firm*—Wei Te Chung

(57) ABSTRACT

A system of testing a computer includes at least a computer (10) to be tested and a testing server (60) that connects to the computer. The testing server has test scripts for testing the computer. The system of testing the computer further includes a bootable disk (20) that connects to the computer. The bootable disk includes a testing image for starting up the computer. A method of testing a computer based on the testing system includes steps as follows: connecting the bootable disk to the computer to startup the computer; downloading test scripts from the testing server to the computer; running the test scripts and testing the computer.

18 Claims, 2 Drawing Sheets

SYSTEM AND METHOD FOR TESTING COMPUTER

FIELD OF THE INVENTION

The present invention relates to systems and methods for testing electronic products, more particularly to a system and a method for testing computers.

DESCRIPTION OF RELATED ART

After a computer is produced, a test of the computer is required. A conventional test system includes a PXE (pre-boot execution environment) server, a DHCP (dynamic host configure protocol) server, a database server for storing test results, and the computer to be tested having at least a hard disk. A test image for testing the computer is stored in the PXE server. A testing method based on the test system includes steps as following: the computer booting up via PXE; the PXE server downloading the test image to the hard disk of the computer; starting a test; uploading test results to the database server; and clearing up the hard disk of the computer so as to provide computers without any unneeded files in the hard disk.

However, some computers haven't a hard disk. So, no operating system or test files can be installed in these computers. The conventional testing method is not suitable for testing these computers without hard disks. Furthermore, it is time consuming for booting via PXE and deleting data in the hard disk of the computer especially in a case of testing a large number of computers.

What is needed, therefore, is a system and a method for testing computers efficiently.

SUMMARY OF THE INVENTION

A system of testing a computer includes at least a computer to be tested and a testing server that connects to the computer. The testing server has test scripts for testing the computer. The system of testing computers further includes a bootable disk that connects to the computer. The bootable disk includes a test image for starting up the computer. A method of testing computers based on the testing system includes steps as follows: connecting the bootable disk to the computer to start up the computer; downloading test scripts from the testing server to the computer; and running the test scripts and starting a test of the computer.

Other advantages and novel features will be drawn from the following detailed description of a preferred embodiment with attached drawings, in which:

DETAILED DESCRIPTION OF THE INVENTION

Figure 1:
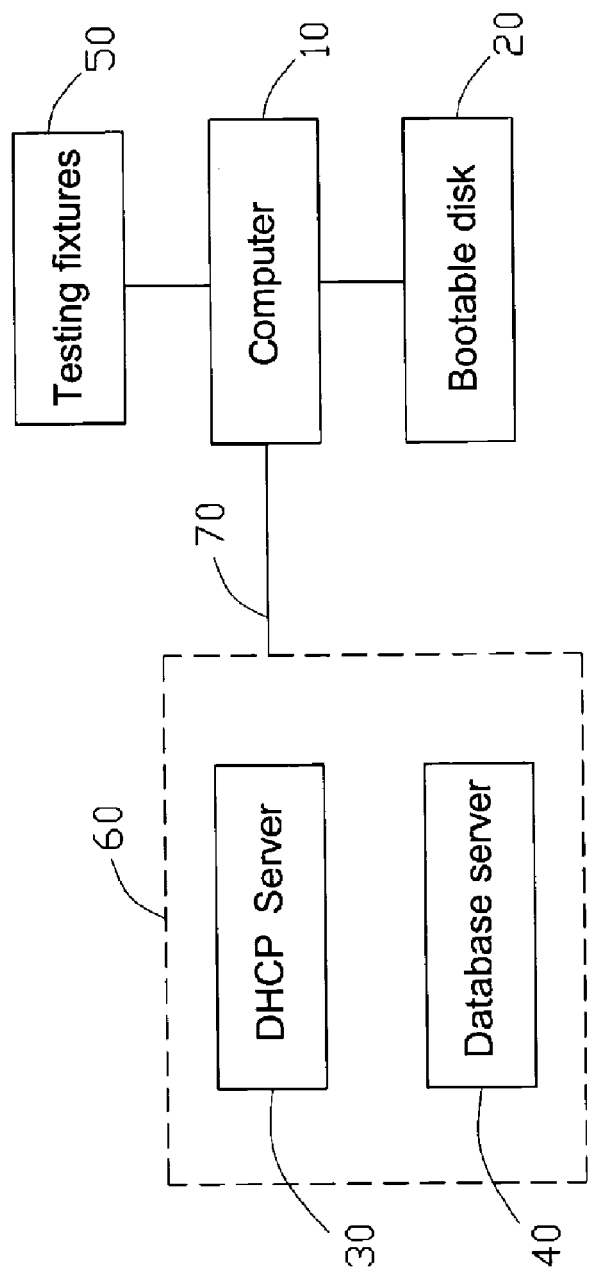
FIG. 1 is a block diagram of a testing system in accordance with a preferred embodiment of the present invention, the testing system including a computer to be tested, a bootable disk, a DHCP server, and a database server.

Referring to FIG. 1, a testing system in accordance with a preferred embodiment of the present invention includes a computer 10 without hard disks to be tested, a bootable disk 20, a DHCP server 30 for assigning an IP address, a database server 40 for storing test results, and testing fixtures 50. The DHCP server 30 and the database server 40 can be integrated in one testing server 60. The testing server 60 is connected to the computer 10 via a network 70. In this embodiment, the testing server 60 and the computer 10 use a Linux operating system.

The computer 10 includes at least a USB interface or CD drive and a volatile memory for storing data.

The bootable disk 20 may be a bootable U disk or a bootable CD, and is connected to the computer 10 via the USB interface or the CD drive of the computer 10. A booting image file is stored in the bootable disk 20 for starting up the computer 10.

The DHCP server 30 is connected to the computer 10 and the database server 40 for assigning an IP address to the computer 10 and the database server 40.

The database server 40 includes test scripts for testing the computer 10. The database server 40 is capable of communicating with the volatile memory of the computer 10. The test scripts are downloaded to the volatile memory of the computer 10 and the volatile memory uploads test results to the database server 40 after a testing process is ended.

The testing fixtures 50 are used to assist testing hardware component of the computer 10.

Figure 2:
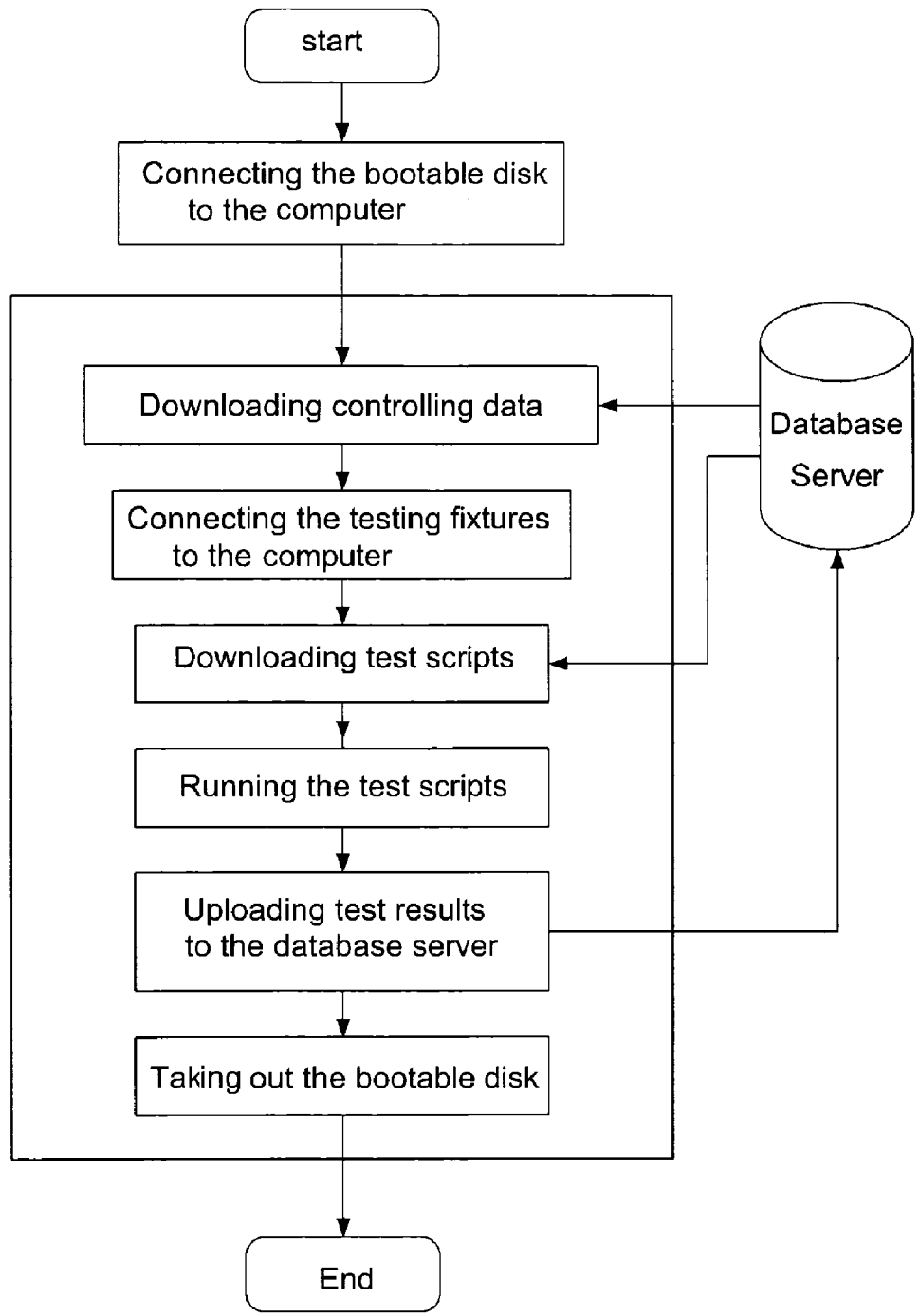
FIG. 2 is a flow chart of a testing method in accordance with a preferred embodiment of the present invention.

Referring also to FIG. 2, a testing method for testing the computer 10 based on the testing system includes following steps:

Step 1: Supplying power to the computer 10 and connecting the bootable disk 20 such as a bootable U disk or a bootable CD to the computer 10 via the USB interface or the CD drive, the computer 10 then accesses the boot image in the bootable disk 20 and starts up;

Step 2: connecting the computer 10 to the testing server 60 via the network 70, then downloading control data from the database server 40 of the testing server 60 to the computer 10 for controlling testing process;

Step 3: connecting the testing fixtures 50 to the computer 10 to help test hardware components of the computer 10;

Step 4: creating test scripts in the database server 40 of the testing server 60, and then downloading the test scripts to the volatile memory of the computer 10;

Step 5: running the test scripts downloaded to the volatile memory of the computer 10 and starting to test the computer 10;

Step 6: uploading test results to the database server 40; and

Step 7: taking out the bootable disk 20 as testing process is ended.

Compared with the conventional testing device and testing method, computers without hard disks can be tested. Furthermore, it is efficient to boot via a bootable disk and run the test scripts in the volatile memory of the computer 10 to be tested. Further, the testing period is shortened.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing system comprising:
   a computer to be tested having a volatile memory;
   a testing server connected to the computer via a network, the testing server storing test scripts for testing the computer; and a bootable disk connected to the computer and storing a booting image far starting up the computer;

wherein the test scripts is downloadable from the testing server to the volatile memory of the computer and is runnable to test the computer;

wherein the testing server comprises functions of a database server and a DHCP server for assigning an IP address to the computer.

2. The testing system as described in claim 1, wherein the bootable disk is a bootable U-disk.

3. The testing system as described in claim 1, wherein the bootable disk is a bootable CD.

4. The testing system as described in claim 1, wherein the computer and the testing server are Linux-based.

5. A testing method for testing a computer having a volatile memory, comprising following steps:

providing a testing server which provides test scripts for testing the computer;

providing a bootable disk which stores a boot image;

connecting the bootable disk to the computer for starting up the computer;

connecting a testing fixture to the computer for facilitating testing hardware components of the computer;

downloading the test scripts from the testing server to the volatile memory of the computer; and running the scripts and testing the computer.

6. The testing method as described in claim 5, wherein the step of connecting the bootable disk to the computer further comprises the computer accessing the boot image in the bootable disk for starting up the computer.

7. The testing method as described in claim 5, wherein the step of providing a testing server further comprises creating/modifying the test scripts in the testing server.

8. The testing method as described in claim 5, further comprising uploading test results to the testing senor after testing process is ended.

9. The testing method as described in claim 5, wherein the downloading step further comprises connecting the computer to the testing server via a network.

10. The testing method as described in claim 5, further comprising, before downloading the test scripts, downloading control data from the testing server to the computer for controlling testing process.

11. A testing method for testing a computer, comprising following steps:

connecting a bootable disk to the computer for starting up the computer;

connecting a testing server, which provides test scripts for testing the computer, to the computer;

downloading the test scripts from the testing senor to the computer; and running the scripts and testing the computer;

wherein the testing server comprises functions of a database server for storing the test scripts and a DHCP server for assigning an IP address to the computer.

12. The testing method as described in claim 11, further comprising, before downloading the test scripts, downloading control data from the testing server to the computer for controlling testing process.

13. The testing method as described in claim 12, further comprising, after downloading the control data, connecting a testing fixture to the computer for facilitating testing hardware components of the computer in the testing process.

14. The testing method as described in claim 11, wherein the bootable disk stores a boot image for string up the computer.

15. The testing method as described in claim 11, further comprising uploading test results to the testing server after testing process is ended.

16. The testing method as described in claim 11, wherein the step of connecting the testing server to the computer further comprises creating/modifying the test scripts in the testing server.

17. The testing system as described in claim 1, further comprising a testing fixture connected to the computer for facilitating testing hardware components of the computer in the testing process.

18. The testing method as described in claim 5, wherein the testing server comprises a database sewer for storing the test scripts and a DHCP server for assigning an IP address to the computer.

* * * * *